United States Patent [19]

Colberg et al.

[11] 3,939,110

[45] Feb. 17, 1976

[54] AQUEOUS POLYELECTROLYTIC ELECTROCOATING MATERIALS OF ORGANIC RESINS

[75] Inventors: Kenneth Herman Colberg, Arlington Heights; Ronald Joseph Zukowski, Buffalo Grove, both of Ill.

[73] Assignee: American Can Company, Greenwich, Conn.

[22] Filed: Jan. 2, 1974

[21] Appl. No.: 430,053

Related U.S. Application Data

[62] Division of Ser. No. 297,419, Oct. 13, 1972, Pat. No. 3,784,093.

[52] U.S. Cl.. 260/29.6 ME; 204/181; 260/29.2 UA; 260/29.2 N
[51] Int. Cl.$^2$..................... C08L 33/02; C09D 5/40
[58] Field of Search 260/29.2 UA, 29.2 N, 29.6 ME; 204/181

[56] References Cited
UNITED STATES PATENTS

| | | | |
|---|---|---|---|
| 3,463,712 | 8/1969 | Coates | 204/181 |
| 3,481,892 | 12/1969 | Huang et al. | 204/181 X |
| 3,575,902 | 4/1971 | Tsou | 260/29.2 UA |
| 3,624,013 | 11/1971 | Sekmakas et al. | 204/181 X |
| 3,657,092 | 4/1972 | Fischer et al. | 260/29.2 UA |
| 3,677,984 | 7/1972 | Aschkenasy et al. | 260/29.6 TA |
| 3,703,596 | 11/1972 | Marx et al. | 260/29.6 TA |
| 3,741,923 | 6/1973 | Fritsche et al. | 260/29.6 ME |
| 3,798,193 | 3/1974 | Parekh et al. | 260/29.4 UA |
| 3,819,548 | 6/1974 | Beck et al. | 260/29.6 ME |

OTHER PUBLICATIONS
Berry, Paint Technology, Vol. 28, No. 1, Mar. 1964, pp. 53–58.

*Primary Examiner*—Lucille M. Phynes
*Attorney, Agent, or Firm*—Robert P. Auber; Paul R. Audet; Ira S. Dorman

[57] ABSTRACT

Improved aqueous electrocoating materials and methods providing improved coating deposits on metal substrates are obtained by adding an alcohol having from 1 to 8 preferably 2 to 4, carbon atoms to an organic coating resin having reactive sites at least partly but not completely neutralized, so that the alcohol is at least partly dispersed in the resin. The alcohol is preferably added before diluting the resin with water and is about 2.0 to 20 weight percent, preferably about 10 weight percent based on the resin.

3 Claims, No Drawings

AQUEOUS POLYELECTROLYTIC ELECTROCOATING MATERIALS OF ORGANIC RESINS

This is a divisional of application Ser. No. 297,419, filed Oct. 13, 1972, now U.S. Pat. No. 3,784,093 issued 8/1/74.

BACKGROUND OF THE INVENTION

This invention relates to the field of electrocoating metal substrates. More particularly, the invention relates to improved electrocoating materials and improved methods for use in electrocoating systems for electrodepositing a coating on interior electrically-conductive surface areas of metal substrates such as container bodies and components.

Basically, electrocoating is the electrodeposition of organic resinous coating materials on electrically-conductive surface areas, from polyelectrolytic electrocoating material mediums which for purposes of this invention are anodic or cathodic, aqueous base bath solutions, suspensions or dispersions. The electrocoating mediums ultimately contain coating ions or polyelectrolytic particles, which, in the case of anodic mediums, carry a negative charge in the bath and when a voltage is applied and current is induced to flow through the medium, migrate to and discharge onto any positively charged surface of a metal substrate, i.e., the anode, which may be in contact with the medium. Conversely, the polyelectrolytic particles, in the case of cathodic mediums, carry a positive charge in the medium, and, upon application of a voltage, migrate to and discharge onto any negatively charged surface of a metal substrate, i.e. the cathode, which may be in contact with the medium.

A layer of particulate coating material is electrodeposited adjacent the electrically charged metal substrate as the direct current flows between it and an oppositely electrically charged electrode such as a wire or rod, immersed in the coating bath. The process is driven by an electrical potential which can typically range from about 50 to 500 volts. The electrodeposition of the coating material takes place only at electrically-conductive surface areas of the metal object because only at such areas is there an electrical circuit and the electrical action which allows the flow of direct current needed to cause the polyelectrolytic particles to be electrodeposited adjacent the electrically-conductive surface.

The thickness of the layer of particulate material electrodeposited is automatically regulated by the electrical conductivity of the particular mediums used. Once a certain layer thickness of coating material has attached to the electrically-conductive surface area of the metal substrate, the electrodeposited coating material, in having a low electrical conductivity, increasingly tends to insulate the surface area from the coating bath in which it is immersed, transforming it into a non-conductive surface, whereby direct current flow therein greatly diminishes and eventually ceases, with the resulting inhibition of further electrodeposition of coating material.

One particular field where it has been found desirable to coat metal substrates is in the manufacturing of metal containers, cans or components thereof, where it is necessary that all the exposed, uncoated surface areas of the metal can be coated to protect the metal from corrosion.

A typical method which has been used for coating and perfecting coverage thereof on the interior surfaces of metal can bodies such as used in the packaging of beer or carbonated beverages, is to employ a double coat system which involves initially applying a base coat as by roller onto metal stock while in the flat and, after fabricating the can from the coated stock, applying a second or top coat rolled or sprayed onto the interior of the fabricated can or component of seal any discontinuities or other electrically porous or conductive areas in the base coat. The top coat is an overall coat since location of discontinuities is usually not reliably ascertainable.

Recent electrocoating technology has made it possible to eliminate the top coat and to apply in its stead a repair coating only adjacent the discontinuities, or to replace the base and top two-coat system with only a single, full coating.

Since metal containers are usually relatively low cost items, commercially, they must be manufactured at high speeds. Protective organic coatings applied to the interiors of the containers, especially those for packaging food, beer, beverages and like products must be applied at high speeds and must be of very high quality. The containers and coatings thereon are frequently cycled at high temperatures and they often must protect the metal surfaces from corrosive container contents while permitting little or no change or affect in the contents themselves.

Conventional aqueous electrocoating materials used for coating such containers are usually manufactured and shipped as an aqueous concentrate comprising an organic resin such as a carboxylic acid resin, having at least some of its reactive sites neutralized, usually by an amido compound. These materials when shipped usually contain from about 20 to 60 percent resin solids which already or later are made water soluble. Before or during use in electrocoating processes, water, usually de-ionized or distilled, is added to the concentrates to dilute and disperse them into the water dispersion medium.

Heretofore, these aqueous electrocoating materials and mediums have not, for commercial practice, been entirely satisfactory for obtaining the desired high quality coatings on the previously mentioned and like high standard containers and components. One major shortcoming of the coating materials is their insufficient "throwing power", i.e. their inability to evenly, uniformly and sufficiently coat cracks, curves, seams and other container and/or component areas remote from the throwing electrode, as adequately as areas adjacent thereto. One reason for inadequate throwing power is the materials' low initial and/or diminishing resistivity during use. Another major shortcoming is that their deposits or coatings upon metal surfaces form gas bubbles therein. During baking or curing of the coatings at high temperatures, the gases evolve leaving pin holes or voids which seriously affect the coating quality. Another shortcoming is that the materials do not sufficiently wet the metal substrate. This limits their ability to adhere to the substrate and to coat remote areas thereof.

Improving throwing power and wetting ability by slowing coating time is not commercially practical, and increasing voltage to increase throwing power gives non-uniform coatings adjacent to as compared to areas remote from the throwing electrode. The above shortcomings often render it difficult to provide container coatings which obtain quick test, iron pick-up and other test values sufficient to qualify them for use on the aforementioned high-standard containers.

It has now been found that according to this invention the aforementioned shortcomings, problems and disadvantages are overcome. Utilizing conventional operating conditions, improved coatings are obtained employing the aqueous electrocoating methods and materials or mediums of this invention. The coatings obtained have the same or increased resistivity, increased throwing power, and more even, more uniform and thicker overall coatings. Wetting and adhesion to the metal substrate is improved, and importantly, the coatings and deposits obtained are more pliable. This releases more entrapped gases and leaves less pin holes and voids after curing. Further, higher quality coatings with lower quick test, iron pick-up and other test values are provided.

These and other advantages are achieved with the improved electrocoating methods and improved aqueous electrocoating materials of this invention which generally involve adding with agitation, to obtain presence in the materials, of an alcohol having from 1 to 8 carbon atoms.

SUMMARY OF THE INVENTION

This invention is an improvement in electrocoating methods and in electrocoating materials employed therein.

In a method of electrocoating of the type wherein a coating is deposited upon a metal substrate by passing electric current through a circuit comprising a cathode, the metal substrate as an anode and an aqueous polyelectrolytic electrocoating medium in contact with each, the medium being of the type wherein there is dispersed in water, an organic resin having its reactive sites partly but not completely neutralized, the improvement comprises: adding an alcohol having from 1 to 8, preferably from 2 to 4 carbon atoms, in an amount of from about 2.0 to 20, preferably about 10 weight percent based on the weight of the resin, and, agitating the medium to disperse the alcohol therein.

The organic resin can be a synthetic polycarboxylic acid resin whose reactive sites are partly but not completely neutralized with a water soluble amino compound or it can be a synthetic resin having N-functional groups partly but not completely neutralized with an acid.

Preferably, the alcohol is added before, although it can be added after, adding water, preferably de-ionized, to the medium. Preferably, the alcohol added is about 10 weight percent based on the resin and is at least partly water soluble such as isopropanol, and, the de-ionized water preferably added after the alcohol, is a dispersion medium for the alcohol and the resin.

As coating operations continue wherein the improved electrocoating method is employed and the medium is being used up, the improvement can comprise gradually adding to the medium being used up, more of the original medium comprising a concentrate of the same partly but not completely neutralized resin with the same amount of the alcohol dispersed therein, to maintain substantially the same properties of the original medium during the electrocoating process. Preferably, the alcohol added to the original resin is isopropanol added in an amount of about 10 weight percent based on the weight of the resin.

The improved aqueous polyelectrolytic electrocoating material is of the type containing a partly but not completely neutralized organic resin concentrate dispersed in water and used in contact with an anode and a cathode as an electric circuit in an electrocoating process for coating a metal substrate. The improvement in the aqueous polyelectrolytic electrocoating material comprises the inclusion therein of an alcohol having from 1 to 8 carbon atoms at least partly associated with and dispersed in the resin concentrate of the material in an amount of from 2.0 to 20 weight percent based on the weight of the resin.

The organic resin can be a synthetic polycarboxylic acid resin concentrate partly but not completely neutralized with a sufficient quantity of water soluble amino compound to maintain the polycarboxylic acid resin as a dispersion of anionic polyelectrolyte in the material, or the aqueous electrocoating material can be a synthetic resin having N-functional groups partly neutralized with an acid.

Preferably the alcohol is partly water soluble has from 2 to 4 carbon atoms, is isopropanol, and is present in an amount of about 10 weight percent based on the weight of the resin.

The invention also includes an improved method of improving the performance of a depleted aqueous polyelectrolytic electrocoating bath of the type containing an organic resin concentrate dispersed in water and having its reactive sites partly but not completely neutralized, the resin in the bath having been at least partly used up during an electrocoating process wherein an electric current was passed through a circuit comprising the bath in contact with an anode and a cathode, the improvement in this improved method comprising adding to the depleted bath more of the original resin concentrate, the added resin concentrate having at least partly associated therewith and dispersed therein, an alcohol of from 1 to 8 carbon atoms in the amount of from 2.0 to 20 weight percent based on the weight of the resin. Preferably, the alcohol has from 2 to 4 carbon atoms, is partly water soluble, and is isopropanol in the amount of about 10 weight percent based on the weight of the resin.

DETAILED DESCRIPTION OF THE INVENTION

The improvements of this invention involve adding an alcohol to conventional aqueous polyelectrolytic electrocoating materials or mediums of the type employed in conventional electrocoating methods for coating a metal substrate wherein an electric current is passed through the material while it is in contact with an anode and a cathode.

The alcohol can be added to most conventional aqueous electrocoating materials or mediums after they have been used or as they are originally obtained from manufacturers. Usually, electrocoating materials such as those suitable for coating metal cans and components are manufactured and shipped as a concentrate having from about 20 to 60 percent resin solids. The concentrate generally comprises, dispersed in some water, an organic resin having reactive sites which are partly but not completely neutralized. Neutralization of the resins has a solubilizing effect. It renders them water miscible or water soluble so that they can be dispersed therein.

Typically, either before or, less commonly, during the actual electrocoating process, the shipped concentrate is diluted or let down with water to form a relatively low solids make-up bath wherein the resin solids are a dispersed phase within the water dispersion medium.

The amount of water added to dilute the concentrate is a suitable conventional amount which can vary depending on the amount of resin solids in the concentrate, the type of metal substrate being coated, and the amount of solids ultimately desired deposited thereon. Usually, water is added in an amount sufficient to reduce the concentrate from about 20 to 60 percent resin solids to an aqueous bath having from a measurable percent to about 20 weight percent resin solids, commonly the resin solids are reduced to from about 5 to 10 (for full coating) and from about 1 to 6 (for repair coating) weight percent resin solids based on the bath. Low solids baths are especially suitable for use with high speed can electrocoating machines. At speeds such as 550 cans/min., percentages above 20 result in commercially impractical viscosities, while low percentages obtain practical viscosities and mean less loss of solids due to drag-out as cans are dragged out of baths.

This invention involves adding an alcohol having from 1 to 8 carbon atoms to conventional aqueous electrocoating materials to improve their performance and to improve the electrocoating processes in which they are employed. The alcohol can be added to fresh, old, or used aqueous electrocoating materials either before or after the solubilized or neutralized resin concentrates of the materials are diluted or let down with water.

Examples of alcohols having from 1 to 8 carbon atoms which can be employed according to this invention are methanol, ethanol, propanol, isopropanol, n-butanol, isobutanol, sec-butanol, tert-butanol, amyl alcohol, isoamyl alcohol, hexanol, 2-ethyl hexanol, heptanol, and octanol.

Generally, the alcohols suitable for this invention have solubility parameters in the range of about 9.9 to 14.0, hydrogen bonding indexes of about 13.0 to 20.0, and dipole moments of about 1.6 to 2.6.

The amount of alcohol which can be added to conventional aqueous polyelectrolytic electrocoating materials is from about 2 to 20 weight percent, preferably about 10 weight percent, based on the weight of the resin solids in the material.

Alcohols of the above type preferably are added to electrocoating materials obtained in neutralized or solubilized resin concentrate form, before the addition of water to assure that the alcohol disperses in the resin concentrate and at least some of the alcohol unites or associates with the resin. This is especially true for alcohols such as those having about 5 to 8 carbon atoms since these alcohols for purposes of this invention are considered very slightly soluble in or miscible with water. Examples of these are amyl alcohol, isoamyl alcohol, hexanol, 2-ethyl hexanol, heptanol, and octanol.

Alcohols having 1 to 5 carbon atoms such as methanol, ethanol, propanol, and isopropanol, considered, for purposes of this invention water soluble or water miscible, and butanol, considered somewhat water soluble or miscible, can be added to the resin concentrate after adding de-ionized water, though they preferably should also be added before adding water. As in the case with the less soluble alcohols, adding them before adding water facilitates and assures their uniting with or coming into association with resin particles.

The alcohols of this invention preferably are added slowly to the resin concentrates and in all cases while agitating the concentrates preferably vigorously, and continuing the agitation until the alcohols are dispersed therein. The agitation can be by any conventional means.

Once the alcohol is dispersed in the concentrate, water, preferably de-ionized or distilled is added in a conventional manner, preferably with agitation, to form an aqueous electrocoating bath comprising, the alcohol at least partly dispersed in the resin concentrate and the partly but not completely neutralized resin dispersed in the de-ionized water dispersion medium.

Preferably, alcohols of this invention are added to resins which are from 50 to 85 percent neutralized. As will be shown later, it appears that the best results are obtained when the percentage of neutralization is toward the lower end of the aforementioned range. When neutralization is increasingly above 85 percent, the appreciable benefit of adding an alcohol to the bath lessens. At 100 percent neutralization no benefit is obtained.

The aqueous polyelectrolytic electrocoating materials to which the alcohols having from 1 to 8 carbon atoms can be added to obtain the improved electrocoating materials and processes of this invention can be any of the organic resin-containing materials utilizable as aqueous electrocoating concentrates or baths in metal electrocoating systems. The materials or mediums can be modified, extended and stabilized in the conventional manner.

Suitable aqueous polyelectrolytic electrocoating materials contain organic resins having acrylic or alkacrylic acid moieties. Such acrylic-type resins may be polymers, copolymers, terpolymers, etc. derived by the reaction of acrylic acid or methacrylic acid with vinyl monomers such as alkyl acrylates or methacrylates, butyl acrylate, ethyl acrylate, methyl methacrylate, ethyl methacrylate, vinyl acetate vinyl hydrocarbons such as styrene, ethylene as well as those polymers derived from reaction of mixtures of such vinyl monomers with acrylic or methacrylic acids. The resulting acrylic or methacrylic polymers may be further modified by reaction with suitable crosslinking agents such as melamine, epoxy resins, acrylamides, etc.

Examples of suitable polymers defined hereinabove include acrylic and vinyl polymer resins such as butyl acrylate-methacrylate-methacrylic acid copolymers, and vinyl acetate-acrylic acid copolymers.

The aforementioned organic resins have their acrylic or alkacrylic acid moieties, i.e. their reactive sites neutralized in the conventional manner as by reaction with suitable amido compounds which will attach to and neutralize the resin carboxyl reactive sites. Examples of aqueous materials or mediums which can be employed are those disclosed in U.S. Pat. No. 3,230,162 issued to A. E. Gilchrist on Jan. 18, 1966. Disclosed therein are numerous concentrate compositions comprising baths of aqueous mediums the predominant portions of which are a synthetic polycarboxylic acid resin at least partially neutralized with a sufficient quantity of water soluble amino compound to maintain the polycarboxylic acid resin as a dispersion of anionic polyelectrolyte in the baths. Generally, Gilchrist's concentrate composition comprises about 50 to 95 percent by weight polycarboxylic acid resin having an electrical equivalent weight between about 1,000 and 20,000 and an acid number between about 30 and about 300; about 1 to 10 percent by weight of water soluble amino compound based on the weight of the polycarboxylic acid resin in the composition; and the balance water.

Gilchrist discloses that when the polycarboxylic resin dispersion concentration in a bath is between from about one-half to 1 percent to a practical maximum concentration of about 35 to 40 percent by weight, best film deposition results are obtained. Conventional oxygen sequestering agents can be added to the vehicle in the bath. Scavenger polybasic acids having a molecular weight approaching 1,000, usually in the region of about 500 to 800, can also be added to the bath to prevent it from accumulating an excess of amino. An example is the dimer of linoleic acid. Such polybasic acids apparently form soaps which are codeposited with the resins in the resulting film.

The water soluble amino compounds which Gilchrist states can be employed with anodic baths include: hydroxyamines, polyamines and monoamines such as ethanolamine, triethanolamine; polyglycol amines such as hydroxyl amine diethylene triamine and others such as mono-, di-, and triethyl amines.

Other suitable aqueous polyelectrolytic electrocoating materials are non-polycarboxylic acid resins such as resins formulated from phenolics, polyvinyl ethers and polyimides. For example, a suitable material is a phenolic- poly amidic resin having its reactive sites neutralized by an acid.

The preferred aqueous polyelectrolytic electrocoating materials or mediums improved and used in improved processes according to this invention contain synthetic organic resins of the acrylic-type as hereinbefore explained. Such synthetic acrylic resin containing materials have been found to provide suitable coatings for containers for food and beverage products. Acrylic-type resins provide harder, more inert, less water-permeable, less corrosive and more tast-free coatings than say natural or like oil-derived resins such as amine soaps derived from reactions of carboxyl compounds with oils such as castor oil, which coatings are generally less suitable for high quality food, beer and beverage containers.

Electrocoating processes improved according to the improved method of this invention, viz. with the addition, during agitation, of an alcohol of from 1 to 8 carbon atoms, and the addition of water either before or after the alcohol either before or during the electrocoating process, can be carried out under conventional operating conditions, that is utilizing voltages of from 5 to 500 volts, more commonly from about 100 to 400 volts, and still more commonly from about 100 to 200 volts; amperages of from about 1 to 12 amps depending on the material being used and the coating being effected, e.g. repair or full; coating times usually from about 1 to 4 seconds; and temperatures of about 85° to 105°F.

That adding an alcohol having from 1 to 8 carbon atoms to conventional aqueous electrocoating materials or mediums improves their performance and improves the processes in which they are employed is shown in the following series of Tables comparing test results of coatings of control samples of conventional materials sans alcohol, with samples of the same materials with various alcohols, respectively added thereto. One of the criteria listed in the tables which shows improved results such as adequacy of film build-up and adequacy of coating are the Quick Test values. A typical quick test is to pour an aqueous 1 percent sodium chloride solution into an open-ended tin-free steel (TFS) cylindrical can having its lap seam cemented with a polymeric material (Miraseam Can), its closed end sealed with a steel end closure and its interior roller coated with a single layer of a conventional lacquer. An electrode is placed in the solution and a 6 volt potential is induced in the circuit. The current flowing through the circuit, measured in milliamperes, determines the effectiveness of the repair coat. A perfect repair coat coverage is obtained when there is no current flow.

Quick test values are usually instantaneous readings taken from a milliammeter. An instantaneous reading or value in the art is considered taken within a 5 second interval after current is induced to flow. Although most of the quick test readings shown in the tables herein are instantaneous, it is to be noted that some of the readings, for example those on Table I are taken after 15 second intervals. Instantaneous values are quite lower than values at 15 seconds since milliampere flow increases rapidly with time.

Table I shows some of the alcohols having from 1 to 8 carbon atoms which can be employed to improve the coating performance of exemplary conventional acrylic-type aqueous polyelectrolytic electrocoating materials.

TABLE I

| Material | 10% Alcohol Added (based on wgt. of resin solids) | Conductivity (Resistivity in ohm/cm) | PH | Quick Test (ma at 15 sec) |
|---|---|---|---|---|
| A(used) | — | 3500 | 8.4 | 85,95 |
| " | methanol | 3400 | 8.25 | 65,85 |
| " | propanol | 3600 | 8.30 | 40,55 |
| " | isopropanol | 3800 | 8.20 | 35,45 |
| " | sec-butanol | 3600 | 8.20 | 60,55 |
| " | isobutanol | 3600 | 8.30 | 45,50 |
| " | amyl alcohol | 3600 | 8.15 | 45,35 |
| " | isoamyl alcohol | 3650 | 8.25 | 40,50 |
| " | hexanol | 3800 | 8.25 | 16,10 |
| " | 2-ethyl hexanol | 3550 | 8.20 | 18,40 |
| " | heptanol | 3700 | 8.25 | 50,55 |
| " | octanol | 3600 | 8.30 | 16,45 |
| A'(fresh) | — | 4400 | 8.7 | 5-115, 5-125 |
| " | 2-ethyl hexanol | 4350 | 8.7 | 0-3, 0-3 |
| " | octanol | 4400 | 8.7 | 0-3, 1-11 |
| " | (all others of A) | approx. 4400 | approx. 8.7 | 80, +90 |

TABLE I-continued

| Material | 10% Alcohol Added (based on wgt. of resin solids) | Conductivity (Resistivity in ohm/cm) | PH | Quick Test (ma at 15 sec) |
|---|---|---|---|---|
| B(fresh) | — | 2800 | 8.05 | 8–30,8–35 |
| " | isobutanol | " | 8.03 | 5–30,5–30 |
| " | propanol | " | 8.10 | 1–15,4–20 |
| " | isopropanol | " | 8.15 | 1–16,4–20 |
| B'(used) | — | — | — | 11.10 |
| " | isopropanol | — | — | 1.75 |

A — Acrylic-type aqueous polyelectrolytic electrocoating material (A-T APEM) (used batch) generally comprising a polymer of butyl acrylate-styrene-methacrylic acid hydroxyethyl methacrylate. The material is manufactured and sold by Pittsburg Plate Glass and is sold under the designation 1085. The material was diluted from 28.5 wgt. % resin solids to 2.5 wgt. % solids (based on diluted bath) with de-ionized water. The Quick Tests were run at 300 volts/1 sec. at a bath temperature of 85°F, on Lot No. 1 of Easy-Open tinplate container ends. (Quick Test time was 15 sec. interval).

A'— Fresh batch of material A diluted from 25 to 2.5 wgt. % resin solids based on diluted bath; (other conditions and Lot same as for A except that Quick Test time was instantaneous and at 15 sec. for each run).

B — A-T APEM (fresh) generally comprising a terpolymer of butyl acrylate styrene and methacrylic acid monomers reacted with melamine cross linking agent. (Conditions and Lot same as for A'). The material is designated EXM68074 and is manufactured and sold by Glidden Chemicals(Durkee) SCM Corp.

B'— Same material as B but old batch obtained at 35 wgt. % resin solids, and reduced from 25 wgt. % resin solids to 2.5 wgt. % (based on diluted bath) and run on same Lot at same conditions except that voltage was 200 volts/1 sec.).

A comparison of Quick Test values obtained upon adding isopropanol to materials B and B' indicates an apparent improvement in values when voltage is lowered from 300 to 200 volts, at one second.

When a series of Quick Test values are obtained for a particular conventional aqueous polyelectrolytic electrocoating material, the series tends to have one or more disparately high readings and incongruous values. This may indicate the material's inability to consistently provide effective coatings.

It has been found that adding an alcohol of this invention to such a conventional acrylic-type electrocoating material provides less disparate Quick Test values, which is an indication of more consistently effecitve coatings. Table II shows two series of Quick Tests on one batch (C) and one series on another (C') that gave a few disparate readings, whereas the series on the batch (C') with ethanol added gave less disparate values.

TABLE II

| BATCH | % ALCOHOL ADDED (Based on Weight of Resin Solids) | CONDUCTIVITY (Resistivity in ohm/cm) | PH | QUICK TEST (ma, instantaneous) | | | | | |
|---|---|---|---|---|---|---|---|---|---|
| C | — | 3750 | 8.35 | 1.5, | 1.5, | 2.0, | 6.0, | 6.50, | 11.0 |
| C | — | — | — | 0.25, | 0.25, | 1.25, | 5.50, | 6.50, | 30.0 |
| C' | — | 3300 | 8.2 | 1.5, | 14.0, | 34.0, | 40.0, | 72.0, | 100.+ |
| C' | 50% ethanol | — | — | 0.25, | 1.75, | 2.0, | 2.5, | 6.0, | 20.0 |

C and C' — These are two batches of the A-T APEM respectively believed to be a 74.7% and a 71.7% neutralized polymer of butyl acrylate-styrene-methacrylic acid-hydroxyethyl methacrylate containing no more than 20 weight percent of total polymer units derived from methacrylic and no more than 7 weight percent of total polymer units derived from hydroxyethyl methacrylate. The materials are designated X1222 and are manufactured by Pittsburg Plate Glass. Each Batch C was diluted from 22 weight percent resin solids to 2.07 weight percent resin solids (based on diluted bath) and each Batch C' from 22 weight percent to 2.10 weight percent resin solids (based on the diluted Bath. The Batches were used to repair coat Miraseam TFS cans at a bath temperature of 85°F. at 100 volts/1 sec. The % alcohol added is based on the weight percent resin solids in the diluted bath.

Alcohols suitable for use according to this invention and as indicated by improved Quick Tests providing improved coatings easily acceptable for coating high standard food, beer and beverage containers, are shown in Table III. It is to be noted here and throughout that improved materials providing improved coatings have characteristically been found to effect no substantial loss in, and in most instances either maintain or increase the conductivity of the electrocoating bath in which they are employed. Solvents reducing the conductivity more than say 100 ohm/cm have not been found to provide acceptable coatings.

TABLE III

| MATERIAL | % RESIN SOLIDS | | 10% ALCOHOL ADDED (based on Resin Solids in Diluted Bath) | CONDUCTIVITY (Resistivity in ohm/cm.) | PH | SOLUBILITY PARAMETER | VOLTS/SEC | QUICK TEST (ma, instantaneous and after 15 sec.) | | |
|---|---|---|---|---|---|---|---|---|---|---|
| | Orig. | Diluted | | | | | | 85° | 95° | 105° |
| B″(fresh) | 25 | 3 | — | 1900 | 8.8 | — | 300/1 sec. | 8–18 | 2–6 | 1–7 |
| ″ | ″ | ″ | ethanol | 1950 | 8.6 | 12.7 | ″ | 1–6 | 0–1 | 0–2 |
| ″ | ″ | ″ | isopropanol | 1850 | 8.6 | 11.5 | ″ | 0–0 | 0–3 | 0–2 |
| ″ | ″ | ″ | n-butanol | 1900 | 8.6 | 11.4 | ″ | not run | 0–1 | 1–2 |
| ″ | ″ | ″ | 2-ethyl hexanol | 1950 | 8.6 | 9.5 | ″ | 0–1 | 0–1 | 0–3 |
| ″ | ″ | ″ | dimethyl formamide* | 1600 | 8.95 | 12.1 | ″ | not run | 0–1 | 0–1 |

B″     Different batch of same basic A-T APEM designated EXM68074, described for B of TABLE I and here used to repair coat Lot No. 2 of Easy Open Tinplate Container Ends.
\*     Dimethyl Formamide provided acceptable Quick Tests but is unsuitable for high quality coatings because of unacceptable coating quality as shown in TABLE IV.

A criteria besides Quick Tests values for determining acceptability of coatings is visual examination of their appearances on metal substrates. Of the alcohols or solvents added to the batch of conventional aqueous electrocoating material of Table IV, below, the only solvent tested that clearly improved the coatings was isopropanol.

TABLE IV

| MATERIAL | % RESIN SOLIDS (Orig.) | % SOLVENT ADDED | | % RESIN SOLIDS (Diluted) | CONDUCTIVITY (Resistivity in ohm/cm) | PH | VOLTS/SEC | COATING APPEARANCE | |
|---|---|---|---|---|---|---|---|---|---|
| | | | | | | | | Film | Edges |
| C″ | 22 | | Control | 2.0 | 7300 | 8.6 | 200/2 sec. | sm. | sl. hvy. |
| ″ | ″ | 1% | Isopropanol | ″ | 7600 | — | ″ | ″ | — |
| ″ | ″ | 3% | ″ | ″ | 8900 | — | ″ | ″ | — |
| ″ | ″ | 5% | ″ | ″ | 8800 | 8.65 | ″ | ″ | — |
| ″ | ″ | 1% | Cellosolve | ″ | 7000 | — | ″ | pbly. | — |
| ″ | ″ | 3% | ″ | ″ | 7300 | — | ″ | sl.less pbly. | — |
| ″ | ″ | 5% | ″ | ″ | 7600 | 8.5 | ″ | — | * |
| ″ | ″ | 1% | ethylene glycol | ″ | 5500 | — | ″ | sm. | hvy. |
| ″ | ″ | 3% | ″ | ″ | 4000 | — | ″ | ″ | ** |
| ″ | ″ | 5% | ″ | ″ | 3200 | — | ″ | ″ | ** |
| ″ | ″ | 1% | Glycerin | ″ | 7500 | — | ″ | sl. pbly. | — |
| ″ | ″ | 3% | ″ | ″ | 7400 | — | ″ | plby. | — |
| ″ | ″ | 5% | ″ | ″ | 7400 | 8.5 | ″ | ″ | *** |
| ″ | ″ | 1% | tetra hydrofuron | ″ | 7300 | — | ″ | v. sl. pbly. | sl. hvy. |
| ″ | ″ | 3% | ″ | ″ | 7700 | — | ″ | sl. pbly. | **** |
| ″ | ″ | 5% | ″ | ″ | 8600 | 8.5 | ″ | ″ | **** |
| ″ | ″ | 1% | Dimethyl Formamide | ″ | 7300 | — | ″ | sl. pbly. | sl. hvy. |
| ″ | ″ | 3% | ″ | ″ | 7600 | — | ″ | ″ | ″ |
| ″ | ″ | 5% | ″ | ″ | 7900 | 8.45 | ″ | ″ | edges improve |

C″     Different Batch of same basic A-T APEM designated X1222, described for C and C′ in Table II and here used to full coat 1X4 inch Tin Free Steel Strips. Bath temperature was room temperature, i.e. 70–80°F. Butyl Cellosolve was also tested but was like Cellosolve found inadequate.
\*     pebble finish inadequate on edges
\*\*     some coating loss in rinse, very heavy edges
\*\*\*     some coating loss in rinse from edges
\*\*\*\*     better weight distribution sm. — smooth
pbly. — pebble finish
sl. — slightly
hvy. — heavy
v. — very Still another criteria for determining acceptability of coatings is their preformance when used on a series of components of containers packed with a sulfide-producing product. Table V shows performances of coatings as indicated by the listed Quick Test values and Sulfide Test Grades. The sulfide test generally comprises filling to one-half capacity a series of conventionally base coated tinplate cans having scored, repair-coated (with a solvent-containing material), Easy Open Tinplate Ends atmospherically sealed therein, with a sulfide-producing product or similar chemical solution, and subjecting the filled cans to a processing temperature of 240° F. for 1 hour, and then pressure-cold water cooling and storing them at room temperature for 1 day. Upon visual examination, black sulfide material appears in or adjacent discontinuities in the repair coat or adjacent score lines in the ends. For Table V, the amount of sulfide appearing on the ends was visually graded from a score of 0, indicating no sulfide material, to 10, indicating heavy sulfide material.

TABLE V

| MATERIAL | % RESIN SOLIDS | | % SOLVENT ADDED | CONDUCTIVITY (Resistivity in ohm/cm) | PH (°F) | VOLTS SEC | BATH TEMP. (based on | QUICK TEST (ma, instant) | SULFIDE GRADE (aver.) sulfide amt.) | IRON PICK-UP (ppm aver/6 cans) |
|---|---|---|---|---|---|---|---|---|---|---|
| | Orig. | Diluted | | | | | | | | |
| D | 27.5 | 2.5 | — | 3500 | 7.95 | 200/1sec | 85° | 2.3,2.4,6,4.5 | 3.6 5(slightly) | not determined |

TABLE V-continued

| MATERIAL | % RESIN SOLIDS Orig. | % RESIN SOLIDS Diluted | % SOLVENT ADDED | CONDUCTIVITY (Resistivity in ohm/cm) | PH | VOLTS SEC | BATH TEMP. (°F) | QUICK TEST (ma, instant) | QUICK TEST (aver., based on sulfide amt.) | SULFIDE GRADE | IRON PICK-UP (ppm aver/6 cans) |
|---|---|---|---|---|---|---|---|---|---|---|---|
| " | " | " | 2-ethyl hexanol | 3750 | 8.1 | " | " | 1,2,1,2,1,0.5 | 1.1 | 3(very slightly) | " |
| " | " | " | Dimethyl Formamide | 3450 | 8.15 | " | " | 7,4.5,3,3.5,6,4.5 | 4.5 | 4(slight) | " |
| B''' | — | 3 | 10% 2-ethyl hexanol* | — | — | 300/1sec | 95° | no data available | 8 (15 sec) | 8(heavy) | " |
| " | 21 | 3 | 10% 2-ethyl hexanol** | — | — | " | " | " | 2 (15 sec) | 4(slight) | " |
| B'''' | 25 | 2.5 | — | — | — | 200/1sec | 85° | " | 11.10 | 4(slight) | " |
| " | " | " | 10% iso-propanol | — | — | " | " | " | 1.75 | 3(very slight) | " |
| C''' | 22 | 2 | — | — | — | 100/2sec | 80° | 1.25,1.75, 1.50,8.0, 0.75,6.5 | 3.3 | not determined | 1.01 ppm |
| " | " | " | 10% 2-ethyl hexanol | — | — | 100/2sec | " | 0.0,1.0, 0.0,0.25, 0.5,0.75 | 0.4 | " | 0.58 ppm |

D — A-T APEM (fresh) designated EXM 69115 and manufactured by Glidden Chemicals, Durkee Div. of SCM Corp.

C''' — Different batch of same material as C in Table II, i.e. X1222, here used to repair coat six Miraseam (TFS) cans.

* — 2-ethyl hexanol here added to diluted bath containing 3 wgt. % resin solids 10 wgt% ethyl hexanol is based on the 3 wgt. % resin solids in the diluted bath.

B''' — Different batch of same material as B in Table I, i.e. EXM68074 here used to repair coat tinplate ends.

B'''' — Different batch of same material as B' in Table I, EXM6804 here used to repair coat Miraseam (TFS) cans.

** — 2-ethyl hexanol here added to the 21 wgt% resin solids concentrate; after the alcohol was dispersed in the concentrate, de-ionized water was added to dilute to 3% resin solids based on the diluted bath The sulfide grades shown in Table V that the coatings tested were most improved when they contained an alcohol of this invention.

It is to be noted that the data regarding the conventional electrocoating material designated B''' in Table V indicates that for the less soluble alcohols of this invention, for example here, 2-ethyl hexanol it is preferred and best grade results are obtained when such alcohols are added directly to the resin solids concentrate before, rather than after, diluting the resin solids concentrate from say 21 percent resin solids concentrate to a 3 weight percent resin solids diluted bath. Addition of the less soluble alcohols of this invention to the diluted bath renders it more difficult for the alcohols to become associated with the smaller amount of resin solids widely dispersed within a greater amount of water dispersion medium.

Still another criteria for determining the performance of coatings are Iron Pick-up Test Values. Table V shows that for aqueous electrocoating material C''' lower iron pick-up values are obtained when 2-ethyl hexanol is added to the material. An Iron Pick-up test determines over a period of time the number of parts of ferrous or ferric metal ions dissolved into or picked-up by a million parts contained in a metal substrate container that has been repair coated and that is still allowing some minute current flow to and corrosion of the metal substrate. The iron pick-up values listed in Table V were based upon an average of six Miraseam (TFS) cans containing beer and stored at 98°F. for 1 month.

As stated in comments regarding material B''' of Table V the preferred method of adding alcohol to the resin solids concentrate according to this invention is to add it directly to the concentrate before, rather than after, diluting the concentrate to a low solids bath. The appearances of residual rinse water obtained from rinsing a series of Miraseam (TFS) cans coated as shown in Table VI is further evidence of this, since the relative clarity and cloudiness of rinse water generally indicates relative absence or presence of resin solids therein, and since cloudy rinse water was obtained by adding 2-ethyl hexanol to the original concentrate as compared to clear rinse water when the alcohol was added to the diluted bath. As previously explained, Table VI further shows the importance of adding the less soluble alcohols of this invention directly to the concentrate.

It has been found, and it is significant to note that, as shown in Table VI, the alcohol added to the electrocoating material according to this invention must enter the dispersed phase of the bath, i.e. it must enter and become united or associated with the resin solids of the material. Whereas 2-ethyl hexanol added to the diluted bath obtained relatively high quick tests and coatings with little solids therein as indicated by the relatively clear rinse water, with extended additional mixing, of the 2-ethyl hexanol within the diluted bath obtained close to very cloudy rinse water. This indicates that it is necessary that the alcohol enter the dispersed phase and be associated with the resin solids for a significant amount of resin solids to appear in the coatings. Best results with 2-ethyl hexanol were obtained when, of course, the alcohol was added directly to the original concentrate and mixed therewith.

TABLE VI

| MATERIAL | % RESIN SOLIDS | | % ALCOHOL ADDED TO | | QUICK TEST | APPEARANCE OF RINSE WATER |
|---|---|---|---|---|---|---|
| | Orig. | Dil. | Orig. | Dil. | | |
| C'''' | 22 | 2 | — | — | 10.6 | — |
| '' | '' | '' | — | 15% 2EH* | 3.3 | relatively clear |
| | | | | 20% 2EH* | 3.6 | relatively clear |
| '' | '' | '' | *** | — | — | approaching very cloudy |
| '' | '' | '' | 15% 2EH | — | 1.5 | very cloudy |
| | | | 20% 2EH | | 2.5 | very cloudy |
| '' | '' | '' | — | 5% IPA** | 1.2 | slightly cloudy |
| | | | | 10% '' | 0.6 | slightly cloudy |
| | | | | 20% '' | 1.0 | slightly cloudy |

*2-ethyl hexanol
**Isopropanol
***with extended additional mixing

As shown in Table VII below, the improved materials and method of this invention can be employed in relation to full coating as well as repair coating various containers and components.

better coating results, ambient bath temperatures, 300 volts/secs on drawn and ironed steel containers than the same bath solution simply diluted with water and not having an alcohol added thereto. In the former

TABLE VII

| MATERIAL | % RESIN SOLIDS | | % ALCOHOL ADDED (based on resin solids in bath) | VOLTS/SEC | BATH TEMP. (°F.) | QUICK TEST (ma, instantaneous aver/2 cans |
|---|---|---|---|---|---|---|
| | Orig. | Dil. | | | | |
| E | 27.5 | 2 | — | 200/1sec | 75–80° | 12.5 |
| '' | '' | '' | 10% isopropanol | '' | '' | 4.5 |
| F | 30 | 3 | — | 300/1sec | 80° | 40–70 |
| F' | 30 | '' | 6% isopropanol | '' | '' | 20–40 |

E — A-T APEM generally comprising a polymer of ethyl acrylate, methyl methacrylate and methacrylic acid effected with n-butoxy and methacrylamide agent. The material was used to full coat 2 drawn tinplate cans.
F & F' — A-T APEM (cathodic) generally comprising a phenolic-polyamidic resin, the reactive sites of the polyamide being neutralized by acetic acid. The phenolic resin is designated Super Beckacete 24-001 manufactured by Riechold Chemicals, Inc., and the polyamide is designated Versamid 100 manufactured by General Mills, Inc. The material F was used to full electrocoat Easy Open Tinplate container ends.

The material designated F was made by dissolving 40 grams of the polyamide Versamid 100 with 60 grams of the phenolic material Super Beckacite 24-001, in 13 grams of methyl, isobutyl ketone (MIBK) and 20 grams of toluene. When the materials were completely dissolved, 5 grams of glacial acetic acid were added thereto to ionified or neutralize the reactive sites of the polyamide. Thereafter, 200 grams of de-ionized water was added to dilute the original 30 percent resin solids concentrate to a resulting 3 weight percent resin solids based on the diluted bath.

The material F' comprises essentially the same materials except that the 10 grams of toluene was replaced with 10 grams of isopropanol, the de-ionized water being added thereafter to reduce the resin solids in the same manner.

It is to be noted that when the alcohols of this invention are added to the aforementioned conventional aqueous polyelectrolytic electrocoating materials, the surface tension of the resulting bath is only slightly affected by such addition. For example, whereas a five percent resin solids material hereabove designated X1222 has a surface tension of 40.4 dynes/cm, the same material having ten percent isopropanol (based on bath solids) had a surface tension of 40.2 dynes/cm, and with the same percentage of 2-ethyl hexanol had a surface tension of 38.3 dynes/cm.

It has been found that the addition of 20 weight percent based on a 5 weight percent solids diluted bath solution of hereinbefore designated X1222 obtained case, 278 grams of coating extended to within 1/16 inch from the bottoms of the containers, in the latter case 309 grams of coating extended to only one-eighth inch from the bottoms.

It has been found that improved coatings were not obtainable when an alcohol of this invention was added to an aqueous electrocoating material designated RC1137-70 manufactured by De Soto and believed to be a one hundred percent neutralized polymer of acrylic acid, and esters thereof. Although the chemical mechanisms of adding an alcohol to this invention to obtain an improved coating deposits are not fully understood, the aforementioned inability to improve a coating believed to be 100 percent neutralized may indicate that the addition of alcohol tends to provide small electrolytic coating particles and tends to prevent them from agglommerating into larger particles, the 100 percent neutralized material perhaps having the smallest particle sizes. The smaller particle sizes obtained by the addition of the alcohols therein, obtains more compact deposition of particles, generally higher resistivities, better throwing and wetting power and easier, smoother release of vapors in the coatings during baking.

A typical method of employing this invention is to pour a 22 weight percent resin solids concentrate of an aqueous polyelectrolytic electrocoating material such as hereinbefore designated X1222 into a large drum. Ten weight percent of an alcohol such as isopropanol based on a precalculation of a predetermined amount of solids, say 2 percent after dilution, is added to the drum with agitation until the alcohol is completely dispersed into the resin concentrate. A certain amount, say 5 gallons, of the material is taken from the drum and diluted to a 2 percent solids bath with de-ionized water. This bath is used to repair or full electrocoat metal substrates, and when its performance begins to dwindle or is depleted (here meant to some extent) another 5 gallons of the alcohol-containing concentrate is drawn into another container and added to the "depleted" bath as needed, to thereby replenish the original bath, and to thereby maintain substantially the same properties as the original bath or medium during the electrocoating process.

It is thought that the invention and many of its attendant advantages will be understood from the foregoing description and it will be apparent that various changes may be made in the methods and materials described and their effectuation without departing from the spirit and scope of the invention or sacrificing all of its material advantages, the methods and materials hereinbefore described being merely preferred embodiments thereof.

We claim:

1. An aqueous polyelectrolytic electrocoating concentrate dispersable in water to form a bath used in contact with an anode and a cathode in an electric circuit of an electrocoating process for electrocoating a metal substrate, which comprises from about 20 to 60 weight percent synthetic polycarboxylic acid resin solids based on the concentrate, said solids being soluble in alcohols haivng from 1 to 5 carbon atoms, and having from 50 to 85 percent of their reactive sites neutralized with a sufficient quantity of water soluble amino compound to maintain the polycarboxylic acid resin solids as a dispersion of anionic polyelectrolyte in the concentrate, and a monohydric alcohol having from 1 to 5 carbon atoms selected from the group consisting of methanol, ethanol, propanol, isopropanol, n-butanol, isobutanol, sec-butanol, tert-butanol, amyl alcohol and isoamyl alcohol, said alcohol being at least partly associated with and dispersed in the resin concentrate in an amount of from 2.0 to 20 weight percent based on the weight of the resin solids, the presence of said alcohol being to at least maintain the resistivity and increase the throwing and wetting power of the medium bath, and to provide a higher quality, more pliable coating which releases more vapors from and leaves less voids in the coating upon curing than if said monohydric alcohol were not present in the concentrate.

2. The improved electrocoating material of claim 1 wherein the alcohol is partly water soluble and has from 2 to 4 carbon atoms.

3. The improved electrocoating material of claim 2 wherein the alcohol is isopropanol present in an amount of about 10 weight percent based on the resin.

* * * * *

UNITED STATES PATENT OFFICE
CERTIFICATE OF CORRECTION

PATENT NO. : 3,939,110
DATED : February 17, 1976
INVENTOR(S) : Kenneth Herman Colberg
Ronald Joseph Zukowski It is certified that error appears in the above-identified patent and that said Letters Patent are hereby corrected as shown below:

In the Title, before ELECTROCOATING, delete "AQUEOUS POLYELECTROLYTIC"; after MATERIALS, delete "OF ORGANIC RESINS".

Signed and Sealed this fourth Day of May 1976

[SEAL]

Attest:

RUTH C. MASON
*Attesting Officer*

C. MARSHALL DANN
*Commissioner of Patents and Trademarks*

UNITED STATES PATENT AND TRADEMARK OFFICE
CERTIFICATE OF CORRECTION

PATENT NO. : 3,939,110
DATED : February 17, 1976
INVENTOR(S) : Kenneth Herman Colberg
Ronald Joseph Zukowski It is certified that error appears in the above—identified patent and that said Letters Patent are hereby corrected as shown below:

In the Title, before ELECTROCOATING, delete "AQUEOUS POLYELECTROLYTIC"; after MATERIALS, delete "OF ORGANIC RESINS".

In the Heading, under subject heading Related U.S. Application Data, and following Oct. 13, 1972, delete "Pat No. 3,784,093" and substitute therefor -- now abandoned --;

In the Specification, Col. 1, line 6, after now, delete "U.S. Pat. No. 3,784,093 issued" and substitute therefor -- abandoned --;

Col. 1, line 7, delete "8/1/74".

This certificate supersedes Certificate of Correction issued May 4, 1976.

Signed and Sealed this twenty-ninth Day of June 1976

[SEAL]

Attest:

RUTH C. MASON
*Attesting Officer*

C. MARSHALL DANN
*Commissioner of Patents and Trademarks*